United States Patent [19]
Nenonen

[11] Patent Number: 6,148,103
[45] Date of Patent: *Nov. 14, 2000

[54] METHOD FOR IMPROVING CONTRAST IN PICTURE SEQUENCES

[75] Inventor: Petri Nenonen, Tampere, Finland

[73] Assignee: Nokia Technology GmbH, Bochum, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/014,954

[22] Filed: Jan. 28, 1998

[30] Foreign Application Priority Data

Jan. 30, 1997 [FI] Finland .................................. 97-0388

[51] Int. Cl.$^7$ ...................................................... G06K 9/00
[52] U.S. Cl. ............................ 382/169; 382/170; 348/672
[58] Field of Search ..................................... 382/169, 170, 382/162, 164, 224, 165, 266, 274, 168, 260–261; 358/456–458; 348/672, 625, 678

[56] References Cited

U.S. PATENT DOCUMENTS

| | | | |
|---|---|---|---|
| 5,101,440 | 3/1992 | Watanabe et al. | 382/168 |
| 5,140,649 | 8/1992 | Kageyama | 382/167 |
| 5,162,902 | 11/1992 | Bell et al. | 348/678 |
| 5,410,418 | 4/1995 | Yonezawa | 358/456 |
| 5,450,502 | 9/1995 | Eschbach et al. | 382/169 |
| 5,544,258 | 8/1996 | Levien | 382/169 |
| 5,727,080 | 3/1998 | Cox et al. | 382/168 |
| 5,734,746 | 3/1998 | Jaspers | 382/169 |
| 5,808,697 | 9/1998 | Fujimura et al. | 348/672 |
| 5,832,118 | 11/1998 | Kim | 382/224 |

FOREIGN PATENT DOCUMENTS

| | | | |
|---|---|---|---|
| 0576003 | 12/1993 | European Pat. Off. | H04N 1/40 |
| 096958 | 1/1997 | Japan | H04N 1/40 |

*Primary Examiner*—Leo H Boudreau
*Assistant Examiner*—Ishrat Sherali
*Attorney, Agent, or Firm*—Ware, Fressola, Van Der Sluys & Adolphson LLP

[57] ABSTRACT

The invention relates to adjusting contrast in television pictures and other natural picture sequences. In the method according to the invention, the pictures of the picture sequence are gathered into histograms which are processed in certain fashion in order to improve contrast in the pictures, whereafter there are formed mapping functions on the basis of the processed histograms, and the pixel values of the pictures in the picture sequence are then altered on the basis of said mapping functions. The histograms are processed so that from each class where the magnitude of values surpasses a given, predetermined limit, there are cut off all values surpassing said limit, which are then redistributed in the histogram, to classes nearest to the class under observation. The weighting of the distribution controlling the redistribution of the cut-off values advantageously varies according to the class under observation, so that near the low-value end of the histogram, the values are redistributed mainly to classes with higher values than in the class under observation, and near the high-value end of the histogram, the cut-off values are redistributed mainly to classes with lower values than in the class under observation. In the middle region of the histogram, the values are distributed essentially evenly on both sides of the class under observation. Moreover, the cut-off limit can advantageously be defined to be dependent on the class, so that the limit at the extreme ends of the histogram is lower than in the middle region thereof. By applying this procedure, it is possible to avoid a situation where the picture details are covered under areas that are seen nearly black or nearly white. The thus preprocessed histograms are filtered in an adaptive edge-preserving filter, so that flickering is effectively prevented and at the same time there is avoided a distortion of the pictures successive to the cut-off spots in the picture sequence.

14 Claims, 5 Drawing Sheets

METHOD FOR IMPROVING CONTRAST IN PICTURE SEQUENCES

BACKGROUND OF THE INVENTION

1. Technical Field

The invention relates to adjusting contrast in television pictures and other natural picture sequences, and more accurately to improving a single picture by modifying the histogram in a given fashion and to improving the picture sequence contrast by adjusting the method of modifying the histograms of successive pictures.

2. Discussion of Related Art

Histogram equalization is a known method for maximizing picture contrast. A histogram is the distribution of the brightness values of a picture, i.e. in order to create a histogram, the brightness values of a picture are grouped into classes, and the number of brightness values belonging to each class is calculated. The width of a class can vary according to the purpose of use of the histogram. When narrowest, the interval of the extreme values of a class can be one quantizing interval of a pixel value, in which case the histogram is essentially the same as the pixel value distribution. An example of a histogram is illustrated in FIG. 1, where the brightness values of an exemplary picture are divided into 256 classes.

In histogram equalization, the histogram is turned into a so-called mapping function whereby the brightness values of the source picture are converted into brightness values of the target picture, so that the histogram measured of the brightness values of the target picture is equalized. Converting with the mapping function corresponds to a non-linear amplification of an input signal, i.e. to expanding of certain intervals of the brightness distribution and reducing other intervals. In order to equalize a histogram, those areas in the pixel value distribution are expanded which in the original picture contain a lot of values, i.e. at these spots the mapping function must be sharp. A mapping function formed of the histogram of FIG. 1 and producing histogram equalization is illustrated in FIG. 2 (curve 1).

The wide, equally bright areas of the picture are seen as high and narrow peaks in the original histogram. The higher the peak of an original histogram, the wider in the target picture pixel value range are the original values contained in the peak expanded, wherefore the tone differences contained in such a picture area are disproportionately amplified. Such a spot is seen in the mapping function 1 of FIG. 2 as a steeply rising part. Thus the height of the histogram peak can be directly compared with the amplification of the pixel values in said area. Histogram equalization is not as such directly suited to natural pictures so well as for instance to improving contrast in medical pictures, because histogram equalization makes pictures look unnatural. Thus the unfavorable effects of histogram equalization on natural pictures are particularly due to too intensive amplification at some spot of the pixel value distribution.

The disadvantages of histogram equalization can be reduced by reducing the strength of the equalization. In that case the mapping function is evenly converted from a mapping function 1 producing a complete histogram equalization towards a mapping function 3 (i.e. diameter of the diagram) corresponding to zero strength. In the example of FIG. 2, the attenuated mapping function 2 is located in between these two. However, a general reduction in the equalization strength deteriorates the obtained result as for other picture areas apart from those corresponding to the histogram peak.

For the picture there can be defined a maximum amplification limit that must not be surpassed by the histogram peaks. Possible peak values surpassing this limit can be cut out of the histogram already prior to forming the mapping function. The cut-out values must be distributed back to the histogram in order to form the mapping function correctly.

The redistribution of the values cut out of the histogram can be carried out either in consideration to the cutting limit so that it is not surpassed anew, or by allowing it to be surpassed as a consequence of the division. The former case requires more iteration layers, i.e. a lot of calculation power, wherefore it is poorly suited to real-time video signal processing. As for the latter case, it does not offer proper maximum amplification control with the low values of the maximum amplification limit.

The processing of picture sequences sets additional requirements to histogram equalization. If the histogram equalization is performed for each picture separately, even the fairly slight differences contained in the pictures alter the mapping function to such extent that it results in disturbing flickering. Flickering can be eliminated by filtering the histograms temporally, for instance by averaging histograms measured of successive pictures, and by forming the mapping function on the basis of the filtered histogram. A simple average does not, however, eliminate flickering effectively enough. The flickering can be eliminated with sufficiently strong averaging of successive histograms, but then the contrast is distorted at the intersection of the picture sequences, where the picture content changes remarkably, because the pixel value distribution of the pictures preceding the intersection affects the processing of the pictures succeeding the intersection.

The selection of available filters is restricted by the delay caused by them. When the histograms are measured picture by picture, each delay of the filter requires a picture memory, whereby the picture signal is respectively delayed.

SUMMARY OF THE INVENTION

The object of the invention is to develop an automatic method for adjusting the contrast of picture sequences, which method should be simple from the calculatory point of view. Another object is to develop a method that does not distort the pictures to be unnatural. Yet another object is to develop a simple automatic method for adjusting the contrast, which method does not distort the contrast when the picture content in a picture series changes rapidly, but which still effectively prevents the creation of flickering.

These objects are achieved by cutting the gathered histograms so that values surpassing a given maximum amplification limit are cut off, and by then distributing said values back to the histogram, to classes located close to the cut-out class, and by filtering the thus preprocessed histograms in an adaptive filter that preserves the edges.

In a method according to the invention, the pictures of a picture sequence are gathered into histograms which are treated in certain fashion for improving the picture contrast, whereafter on the basis of the treated histograms there are formed mapping functions, and the pixel values of the pictures of the picture sequence are then altered on the basis of said functions. The histograms are processed so that from each class where the magnitude of values surpasses a given predetermined limit there are cut out values exceeding said limit, which are then redistributed into the histogram, to classes located close to the class under observation. The emphasis in the distribution controlling the redistribution of the cut-off values advantageously varies according to the class under observation, so that near the low-value end of the histogram, the cut-off values are redistributed mainly to classes with higher values than in the class under observation, and near the high-value end of the histogram, the cut-off values are redistributed mainly to classes with lower values than in the class under observation. In the middle region of the histogram, the values are distributed essentially equally on both sides of the class under observation. Moreover, the cut-off limit can advantageously be defined to be dependent on the class, so that the limit at the extreme ends of the histogram is lower than in the middle region thereof. By means of this method, it is possible to take into account the sensitivity of the human eye in distinguishing the tone differences in the various pixel value regions and avoid an excessive increase of noise, particularly with dark pixel values. The thus preprocessed histograms are filtered by an adaptive filter maintaining the edges, so that an efficient flicker prevention is achieved and at the same time the distortion of the pictures succeeding the cutting spots of the picture sequence is avoided.

The invention relates to a method comprising the following steps, where from each histogram class where the value magnitude surpasses a given predetermined limit, there are cut off the values surpassing said limit, the cut-off values are redistributed to the histogram according to a given distribution weighted towards the classes lying near to said class, histograms gathered from chronologically successive pictures are filtered through an adaptive edge-preserving filter.

The invention also relates to a method comprising the following steps, where from each histogram class, where the value magnitude surpasses a given pre-determined limit, there are cut off the values surpassing said limit, the cut-off values are redistributed to the histogram according to a given distribution weighted towards the classes lying near to said class, mapping functions formed on the basis of histograms gathered of chronologically successive pictures are filtered through an adaptive edge-preserving filter structure, and by means of the filtered mapping functions, the pixel values of the pictures in the picture sequence are modified.

BRIEF DESCRIPTION OF THE DRAWING

The invention is described in more detail below, with reference to the exemplary preferred embodiments and to the appended drawings, where.

Like numbers for like parts are used in the drawings.

DETAILED DESCRIPTION OF PREFERRED EMBODIMENTS

Figure 1:
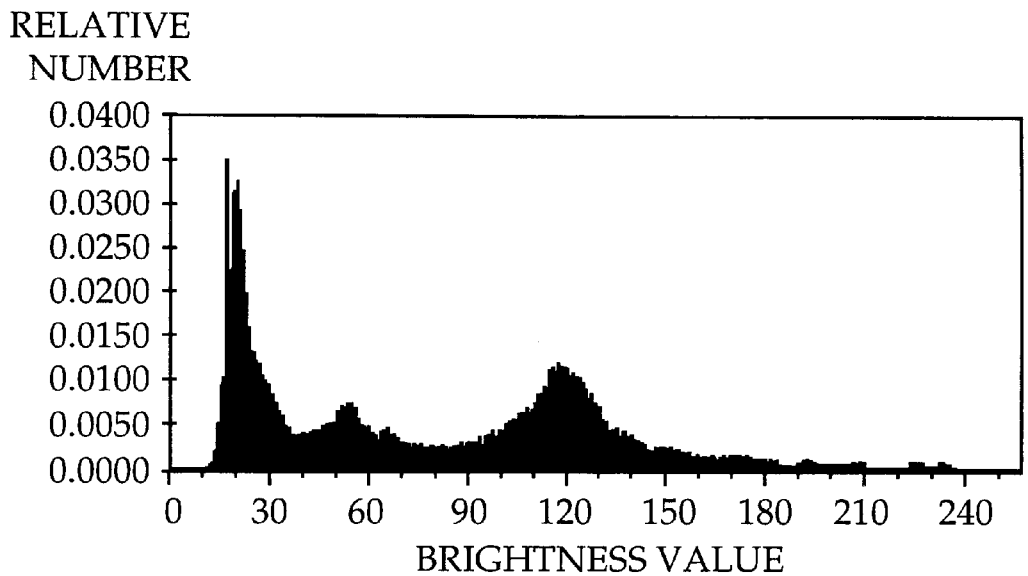
FIG. 1 illustrates an example of a histogram.
Figure 2:
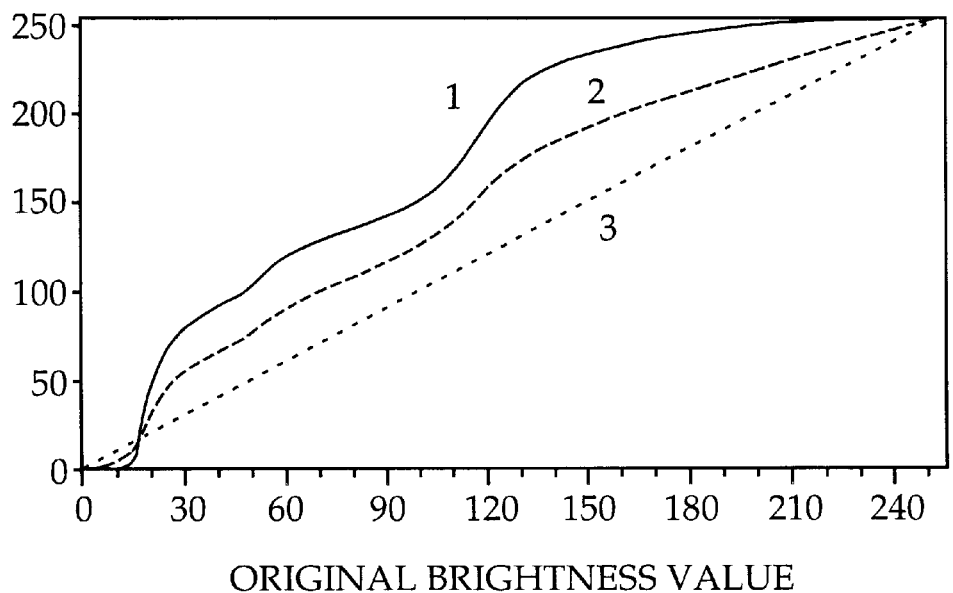
FIG. 2 illustrates examples of mapping functions.
Figure 3:
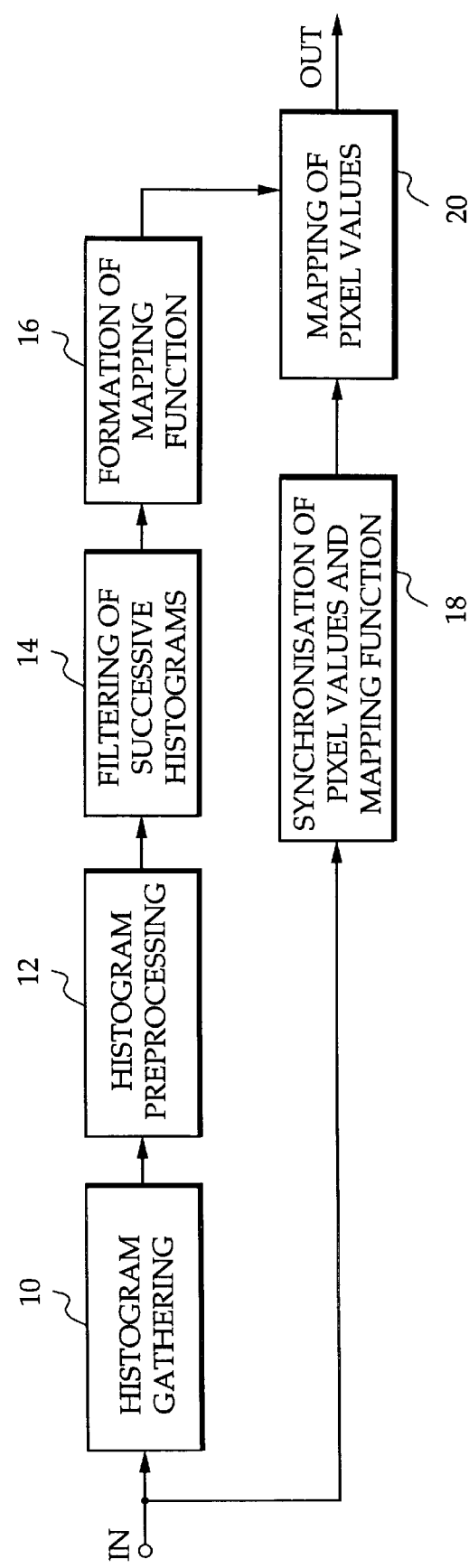
FIG. 3 is a block diagram of a preferred embodiment of the invention.

FIG. 3 is a schematic block diagram illustration of the operation of a preferred embodiment of the invention. In a system according to the invention, histograms are gathered (10) of the incoming pictures, whereafter the histograms are preprocessed (12) in order to equalize the highest histogram peaks. The preprocessed histograms are chronologically filtered (14), and a mapping function is formed (16) on the basis of each filtered histogram. Finally the pixel values of the incoming signal are mapped (20) by means of a mapping function to form initial values. Prior to the mapping of the pixel values, the incoming signal is delayed (18) for the same duration as there is created delay in the histogram processing steps (10–16). The steps represented in FIG. 3 are described in more detail below.

In step 10 of FIG. 3, histograms are gathered of the incoming signal. The gathering of histograms can be carried out in many different ways:

from the whole picture area or only part thereof;

one or several histograms can be gathered from each picture;

from part of the pictures, histograms can be left ungathered, in which case histograms are gathered in order to reduce the required calculation power for instance from every third picture;

in the gathering of histograms, it is possible to observe all pixels in the picture area in question, or only part thereof.

Because the object under observation may be relatively small in comparison with the whole picture area, the visibility of the object may deteriorate in the histogram equalization, if the equalization is carried out on the basis of the whole picture area. Possible subtitles as well as the black bars used in connection with cinemascope films disturb the equalization. If the histogram is gathered from a sampling window located in the middle region of the picture, said window being of the same size as the picture or somewhat smaller, it is possible to emphasize that part of the picture where the important information is most probably located, i.e. the middle region. By leaving the picture edges unobserved when gathering the histogram, the disturbing effect of subtitles and bars is also avoided.

In order to speed up the system, in the calculation of the histogram, part of the pixels in the sampling window can be left out of the calculation. For instance sufficient accuracy is of the order every fifth pixel both in the vertical and horizontal directions, when the picture under treatment conforms to the CCIR 601 standard. In that case it is advisable to lowpass-filter the picture in order to avoid errors caused by folding.

If more than one histogram is gathered from at least a given set of pictures, from different areas of said pictures, histograms gathered from a given region in successive pictures are processed and transformed into mapping functions advantageously apart from the histograms gathered from successive pictures in other regions. Now in the mapping step of the pixel values there can be used more than one mapping function corresponding to a given region in the picture. In an embodiment like this, the mapping function used in the mapping step of the pixel value of each pixel can be chosen or interpolated on the basis of the location of the pixel.

In step 12 of FIG. 3, the histograms are preprocessed in order to cut off the highest peaks of the histograms. In a preferred embodiment of the invention, the histogram values surpassing the maximum amplification limit are expanded only to the classes surrounding the surpassing class, in which case the effect of equalization is not altered with brightness values that remarkably differ from the general value corresponding to the histogram peak. For example a triangular distribution concentrated around a peak renders a better result than the even distribution according to the prior art.

In a preferred embodiment of the invention, the maximum amplification limit is advantageously determined according to the histogram class, so that in the vicinity of the extreme ends of the histogram, the maximum amplification limit is lower than in the middle regions of the histogram. When following this procedure, a weaker amplification is obtained for the extreme end values than for the medium-bright values. Thus it is possible to avoid an excessive increase of total luminance obtained in almost black pictures, and respectively an excessive decrease of total luminance obtained in almost white pictures. An expansion of the distribution of very dark or very light values would also make the noise more visible than with medium-bright values.

Figure 4:
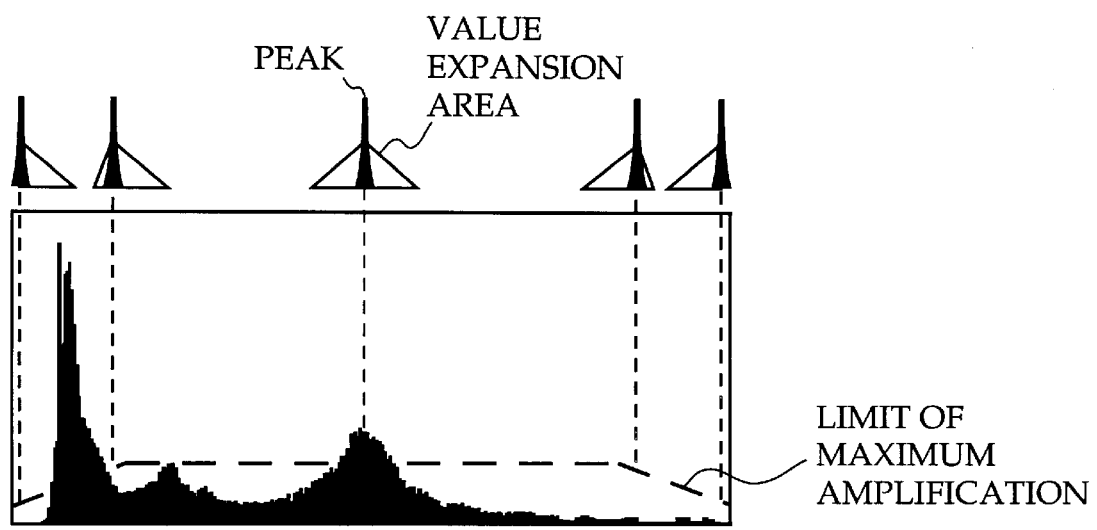
FIG. 4 illustrates how the histogram peaks are equalized in a preferred embodiment of the invention.

The histogram equalization result can be further improved by applying a class-dependent value redistribution method, i.e. for instance by weighting said triangular distribution in different ways on different sides of the class to be distributed. For example, near the extreme ends of the brightness value distribution, it is not advisable to redistribute the cut-off peak values back to the area remaining in between the peak and the extreme end, because this would lead to an excessive intensification of the tone differences of the extreme ends and thus decrease the total contrast. The distribution defining the value redistribution can advantageously be determined individually for each histogram class. Consequently, the redistribution method can be changed according to each class under distribution, for instance in a way illustrated in FIG. 4.

After the first expansion, the values of some classes may still surpass the limit. In a preferred embodiment of the invention, these peaks occurring after the first expansion are cut off and distributed evenly to all classes. In order to speed up the operation, this is carried out only once, so that the equalization of the histogram peaks takes place swiftly. There may still remain some peaks exceeding the maximum amplification limit, but in practice an adequate control is thus obtained for the maximum amplification.

In step 14 of FIG. 3, chronologically successive histograms are filtered for eliminating the flickering phenomenon, among others. In order to avoid an unnatural distortion of the pictures succeeding the cut-off spots, the filter must preserve the edges. Such structures are for instance many known non-linear filters, such as median filters. These, however, produce a delay, wherefore their use is undesirable. An undelayed and effective filtering is achieved with recursive filters. A recursive filtering alone, however, is a compromise between an effective flickering elimination of fairly unchangeable sequences and a rapid adjusting to the new picture after a cut-off spot.

In a preferred embodiment of the present invention, successive histograms are filtered by an adaptive filter, which detects remarkable sudden changes in the picture brightness and adapts itself rapidly to them, but allows only slow changes in the mapping function when remarkable changes do not occur in the brightness of the incoming picture. When using a filter of this type, the pixel value distribution is not remarkably distorted at the cut-off spot of the picture sequence, and disturbing flickering does not occur during slowly changing picture sequences.

Figure 5:
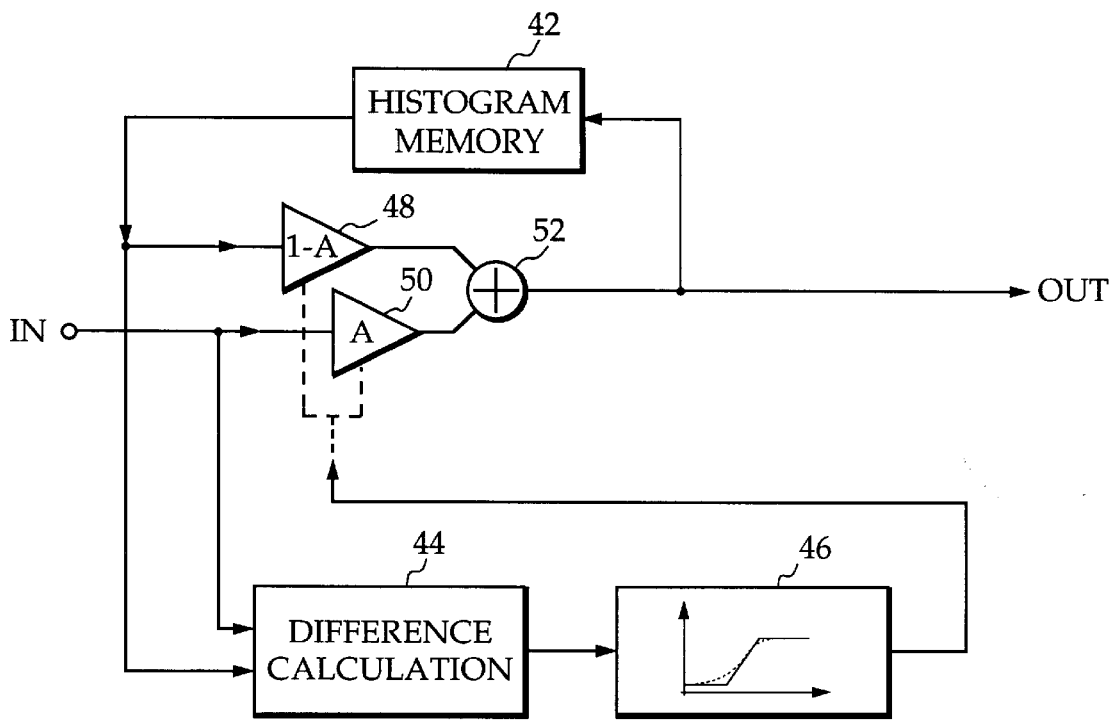
FIG. 5 illustrates how the chronologically successive histograms are filtered according to a preferred embodiment of the invention.

An example of a filter of this type is represented in FIG. 5. In its basic structure, the filter is a recursive filter provided with additional parameter-adjusting members 44, 46 which detect intensive changes in a picture sequence. In the example of FIG. 5, the difference calculation member 44 forms a code number describing the difference between the previous filtered histogram and the new histogram. By means of the code number obtained from the calculating member 44 and describing the difference of said histograms, the adjusting member 46 forms a filter adjusting value, whereby the adjusting member 46 controls the operation of the weighting members 48, 50.

Even a slight, undetectable change in the picture may cause remarkable changes in the original histogram, wherefore it is difficult to calculate the detectable difference on the basis of the original histograms. Because the difference code number is formed on the basis of preprocessed histograms, the highest peaks whereof are expanded in the manner described above, the measures of difference used in the calculation member 44 can be simple models, such as the sum of the absolute differences per class:

$$\delta = \sum_{i=1}^{bins} |h_i - k_i| \qquad (1)$$

where bins is the number of classes, hi is the value of the class i of said preceding filtered histogram and k, is the value of the class i of said new histogram. In the method according to the invention, the difference-describing number code can be calculated in many other known ways, too.

Figure 6:
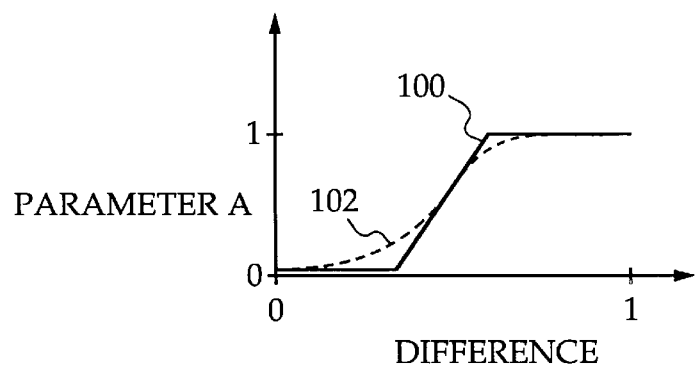
FIG. 6 shows two examples of advantageous functional curves of the adjusting member 46.

A few advantageous examples of the possible operation curve of the adjusting member 46 are illustrated in FIG. 6. In the variable, the difference-describing code number produced by the calculation member 44 is seen on the horizontal axis, and the output value of the adjusting member 46, i.e. the value of the filter control parameter A, is seen on the vertical axis.

By means of the functional curve of the adjusting member 46, it is possible to achieve a desired reaction of the filter to the spots of change in the picture sequence. Advantageously the filter filters slight changes in the histogram, so that with low output values of the calculating member, the output value of the adjusting member is near to zero, and the filter filters fairly intensively. If the preceding histogram and the one under observation differ remarkably, the spot in question is probably a cut-off spot of a picture sequence, in which case it is not advantageous that the histograms calculated from the preceding pictures affect the pictures succeeding the cut-off spot. Now the output value of the adjusting member is advantageously near to one, in which case the filter passes the histogram under observation through without remarkable changes. In between these extreme values, there can advantageously be used for instance functional curves represented in FIG. 6. As examples of advantageous functional curves of the adjusting member 46, FIG. 6 represents a ramp-type function 100 and a sigmoid-type function 102.

Here the fluctuation range of the different parameters from zero to one is only an example that does by no means restrict the different embodiments of the invention; in this example, the value zero describes the bottom limit of the fluctuation range, and one describes the top limit thereof. In the above specification, the calculating member 44 and the adjusting member 46 are described as separate functional blocks only for the sake of clarity of the description. These members can also be combined to form a uniform member producing a corresponding result.

In step 16 of FIG. 3, the preprocessed and filtered histograms are transformed into mapping functions. A mapping function can be defined either for all possible values of the pixel value distribution, or for only certain values, in which case the missing values can be interpolated in connection with the mapping of the pixel values.

Figure 7:
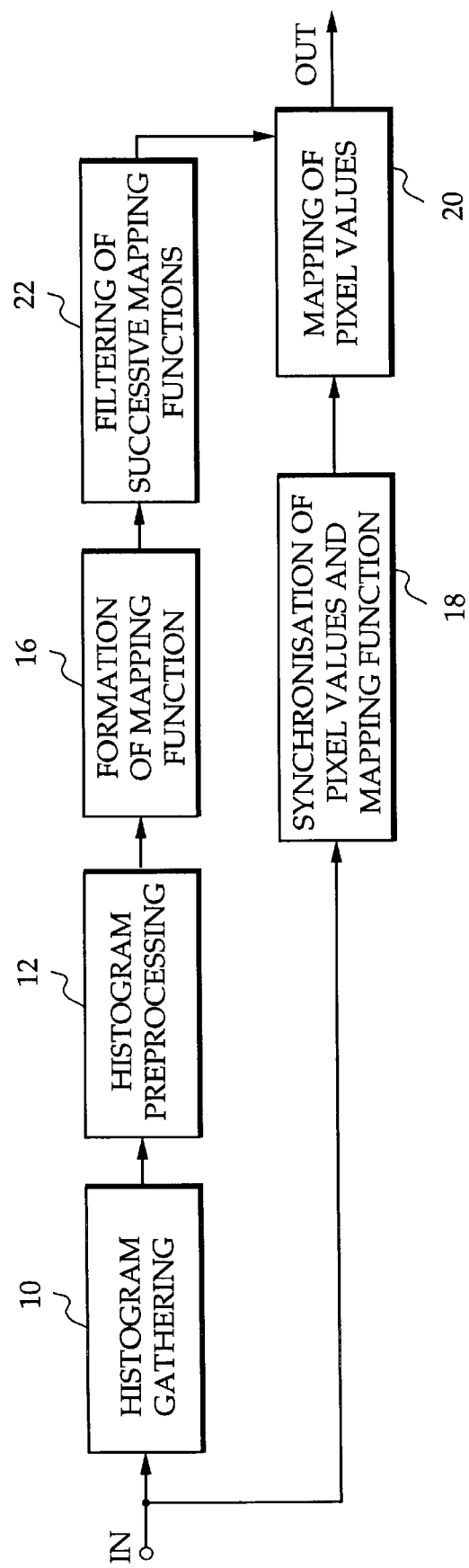
FIG. 7 is a block diagram of a preferred embodiment of the invention.

FIG. 7 illustrates a preferred embodiment of the invention which makes use of the fact that the mapping function and the histogram contain the same information, i.e. on the basis of a histogram, there can always be formed a mapping function, which equalizes the histogram, and vice versa: on the basis of the mapping function, there can always be formed a histogram, which is equalized by said mapping function. In the embodiment of FIG. 7, instead of filtering successive histograms (step 14 in FIG. 3), there are filtered (22) mapping functions formed of histograms. The filtering of mapping functions can be realized in similar fashion as the filtering of a histogram, by using for instance the method described above, in connection with FIG. 6, for filtering chronologically successive histograms.

The method according to the invention can also be applied for treating color information. Also the values of the color components of the vision signal can be altered by means of the mapping function.

The above described method to redistribute the values cut off the histogram, by weighting on the triangular distribution in the vicinity of the cut-off peak, is only one example of possible redistribution methods. In said method step, there can also be applied other types of redistribution that differ from an even distribution.

In connection with the examples describing the different embodiments of the present application, histograms with 256 classes are used by way of example. It is also possible to use, in the various embodiments of the invention, other types of histograms where the class division is defined in a different way than in the examples of the present application.

The system according to the invention can be realized in many different ways, for example by means of a custom-designed application specific integrated circuit (ASIC) or in a programmed fashion, as a control program of a digital signal processor.

The cutting off of the histogram peaks according to the method, as well as the redistribution of the cut-off values, are both carried out rapidly, because the number of the iteration cycles is constant and advantageously small, so that the calculation process does not become too cumbersome for a real-time application.

Owing to an adaptive filtering of successive histograms or mapping functions, the adaptation to the new picture succeeding the cut-off spots in the programme takes place rapidly, whereas in the processing of practically unchanged pictures there is used a slowly changing histogram or a corresponding mapping function, and disturbing flickering is thus avoided.

In the specification above, the invention is described with reference to a few preferred embodiments only, but it is obvious that the invention can be modified in many ways within the scope of the inventional idea defined in the appended claims.

What is claimed is:

1. A method for improving contrast in television pictures and other natural picture sequences provided in a selected chronological sequence of successive pictures, comprising the steps of:

gathering pictures of the picture sequence into histograms, processing histogram class values of the gathered histograms by equalizing histogram class peaks, temporally filtering the processed histograms to prevent flicker, forming mapping functions on the basis of the processed histograms either before or after said step of filtering, and altering said histogram class values of the pictures in the picture sequences on the basis of the mapping functions, said method being characterized in that the step of processing includes the steps of:

cutting off values from histogram classes surpassing a given predetermined limit, redistributing the cut-off values in the histogram according to a distribution weighted toward the classes lying near to said classes surpassing said limit, and wherein said step of temporally filtering is carried out by an adaptive edge-preserving filter structure.

2. A method for improving contrast in picture sequences, comprising the steps of:

gathering pictures of the picture sequence into histograms, transforming histogram class values of the gathered histograms in order to alter the picture contrast by equalizing histogram class peaks, forming mapping functions on the basis of the transformed histograms said method characterized in that the method comprises the steps of:

from each class of the histogram surpassing a given predetermined limit, cutting off the values surpassing said limit, redistributing the cut-off values to the histogram according to a given distribution weighted toward classes lying near to said each class, temporally filtering the mapping functions formed on the basis of histograms gathered of chronologically successive pictures in an adaptive edge-preserving filter structure, and modifying the pixel values of the pictures in the picture sequence by means of the filtered mapping functions.

3. A method according to claim 1, characterized in that said distribution weighted towards the nearest classes is a triangular distribution.

4. A method according to claim 1, characterized in that the distribution used in the redistribution of values cut off from a given class depends on said class.

5. A method according to claim 4, characterized in that at the low-value end of the histogram, the distribution is weighted towards classes with higher values than said class, at the high-value end of the histogram, the distribution is weighted towards classes with lower values than said class, and in the middle region of the histogram, the distribution is weighted essentially equally towards both sides of said class.

6. A method according to claim 1, characterized in that after the first value cutting and redistributing steps, from each class where the value magnitude surpasses a given, predetermined limit, said method further comprises the steps of:

cutting off values surpassing said limit, and redistributing the cut-off values back to the histogram according to an essentially even distribution.

7. A method according to claim 1, characterized in that said given, predetermined limit depends on the class of the histogram under observation.

8. The method of claim 2, characterized in that said distribution weighted towards the nearest classes is a triangular distribution.

9. The method of claim 2, characterized in that the distribution used in the redistribution of values cut off from a given class depends on said class.

10. The method of claim 9, characterized in that at the low-value end of the histogram, the distribution is weighted towards classes with higher values than said class, at the high-value end of the histogram, the distribution is weighted towards classes with lower values than said class, and in the middle region of the histogram, the distribution is weighted essentially equally towards both sides of said class.

11. The method of claim 2, characterized in that after the first value cutting and redistributing steps, from each class where the value magnitude surpasses a given, predetermined limit, said method further comprises the steps of:

cutting off values surpassing said limit, and redistributing the cut-off values back to the histogram according to an essentially even distribution.

12. The method of claim 2, characterized in that said given, predetermined limit depends on the class of the histogram under observation.

13. The method of claim 1, wherein said pictures of the picture sequence are gathered into histograms from a whole picture area.

14. The method of claim 2, wherein said pictures of the picture sequence are gathered into histograms from a whole picture area.

* * * * *